(12) United States Patent
Lindgren

(10) Patent No.: US 8,228,900 B2
(45) Date of Patent: Jul. 24, 2012

(54) MESSAGE ROUTING IN THE IP MULTIMEDIA SUBSYSTEM

(75) Inventor: Hans Lindgren, Älvsjö (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 850 days.

(21) Appl. No.: 12/282,566

(22) PCT Filed: Mar. 14, 2006

(86) PCT No.: PCT/EP2006/060716
§ 371 (c)(1),
(2), (4) Date: Jan. 14, 2009

(87) PCT Pub. No.: WO2007/104360
PCT Pub. Date: Sep. 20, 2007

(65) Prior Publication Data
US 2009/0175265 A1    Jul. 9, 2009

(51) Int. Cl.
*H04L 12/66* (2006.01)
(52) U.S. Cl. ........................................ 370/352
(58) Field of Classification Search .................. None
See application file for complete search history.

(56) References Cited

U.S. PATENT DOCUMENTS

| | | | |
|---|---|---|---|
| 2003/0179762 A1 | 9/2003 | Isomaki et al. | |
| 2006/0077965 A1* | 4/2006 | Garcia-Martin et al. | 370/352 |
| 2007/0274289 A1* | 11/2007 | Buckley et al. | 370/351 |
| 2011/0149956 A1* | 6/2011 | Alt et al. | 370/352 |
| 2011/0306339 A1* | 12/2011 | Walker et al. | 455/432.3 |

FOREIGN PATENT DOCUMENTS

| | | |
|---|---|---|
| CN | 1708167 A | 12/2005 |
| WO | WO 2004/075507 A2 | 9/2004 |
| WO | WO 2004/091165 A | 10/2004 |

OTHER PUBLICATIONS

Schulzrinne Columbia U H: "Emergency Services for Internet Telephony based on the Session Initiation Protocol (SIP)" IETF Standard-Working-Draft, Internet Engineering Task Force, IETF, CH, No. 4, Jan. 8, 2003, XOP15005201 ISSN: 0000.0004—p. 5, paragraph 3.2—p. 8, paragraph 6.2.
Schulzrinne Columbia University H: "The tel URI for Telephone Numbers" IETF Standard, Internet Engineering Task Force. IETF, CH, Dec. 2004 XOP015009738—p. 7, paragraph 5.1.4—p. 9. paragraph 5.2, p. 11. paragraph 8—p. 12, paragraph 9.

* cited by examiner

*Primary Examiner* — Gregory Sefcheck
*Assistant Examiner* — Amar Persaud

(57) ABSTRACT

A system, method, and node for routing a SIP message within an IP Multimedia Subsystem (IMS) from an IMS/SIP client attached to a visited network to a destination address that contains a TEL URI including a local telephone number. The IMS/SIP client places a phone-context within the TEL URI, which specifies whether the local telephone number belongs to the visited network or to the client's home network. The message is delivered to the client's home network, which routes the message according to the phone-context contained within the TEL URI.

8 Claims, 3 Drawing Sheets

MESSAGE ROUTING IN THE IP MULTIMEDIA SUBSYSTEM

FIELD OF THE INVENTION

The present invention relates to message routing in the IP Multimedia Subsystem and more particularly to message routing in the IP Multimedia Subsystem using public user identities in the TEL URI format.

BACKGROUND TO THE INVENTION

IP Multimedia services provide a dynamic combination of voice, video, messaging, data, etc. within the same session. By growing the number of basic applications and the media which it is possible to combine, the number of services offered to the end users will grow, and the inter-personal communication experience will be enriched. This will lead to a new generation of personalised, rich multimedia communication services, including so-called "combinational IP Multimedia" services which are considered in more detail below.

IP Multimedia Subsystem (IMS) is the technology defined by the Third Generation Partnership Project (3GPP) to provide IP Multimedia services over mobile communication networks (3GPP TS 22.228, TS 23.218, TS 23.228, TS 24.228, TS 24.229, TS 29.228, TS 29.229, TS 29.328 and TS 29.329 Releases 5 to 7. IMS provides key features to enrich the end-user person-to-person communication experience through the use of standardised IMS Service Enablers, which facilitate new rich person-to-person (client-to-client) communication services as well as person-to-content (client-to-server) services over IP-based networks. The IMS makes use of the Session Initiation Protocol (SIP) to set up and control calls or sessions between user terminals (or user terminals and application servers). The Session Description Protocol (SDP), carried by SIP signalling, is used to describe and negotiate the media components of the session. Whilst SIP was created as a user-to-user protocol, IMS allows operators and service providers to control user access to services and to charge users accordingly.

FIG. 1 illustrates schematically how the IMS fits into the mobile network architecture in the case of a GPRS/PS access network. Call/Session Control Functions (CSCFs) operate as SIP proxies within the IMS. The 3GPP architecture defines three types of CSCFs: the Proxy CSCF (P-CSCF) which is the first point of contact within the IMS for a SIP terminal; the Serving CSCF (S-CSCF) which provides services to the user that the user is subscribed to; and the Interrogating CSCF (I-CSCF) whose role is to identify the correct S-CSCF and to forward to that S-CSCF a request received from a SIP terminal via a P-CSCF.

A user registers with the IMS using the specified SIP REGISTER method. This is a mechanism for attaching to the IMS and announcing to the IMS the address at which a SIP user identity can be reached. The user receives a unique URI from the S-CSCF that it shall use when it initiates a dialog. In 3GPP, when a SIP terminal performs a registration, the IMS authenticates the user, and allocates a S-CSCF to that user from the set of available S-CSCFs. Whilst the criteria for allocating S-CSCFs is not specified by 3GPP, these may include load sharing and service requirements. It is noted that the allocation of an S-CSCF is key to controlling (and charging for) user access to IMS-based services. Operators may provide a mechanism for preventing direct user-to-user SIP sessions which would otherwise bypass the S-CSCF.

During the registration process, it is the responsibility of the I-CSCF to select an S-CSCF if one is not already selected. The I-CSCF receives the required S-CSCF capabilities from the home network's Home Subscriber Server (HSS), and selects an appropriate S-CSCF based on the received capabilities. [It is noted that S-CSCF allocation is also carried out for a user by the I-CSCF in the case where the user is called by another party, and the user is not currently allocated an S-CSCF.] When a registered user subsequently sends a session request (e.g. SIP INVITE) to the IMS, the request will include the P-CSCF and S-CSCF URIs so that the P-CSCF is able to forward the request to the selected S-CSCF. This applies both on the originating and terminating sides (of the IMS). [For the terminating call the request will include the P-CSCF address and the UE address.]

In the IMS, users are allocated one or more "public user identities". Users' home operators are responsible for this allocation. A public user identity is either a SIP URI or a TEL URI. A SIP URI typically has the format sip:firstname.lastname@operator.com whereas a TEL URI represents a phone number. A TEL URI representing a phone number in international format looks like:

+44-123-456-7890.

The use of TEL URIs allows the IMS to break out calls, from an IMS client, to a circuit switched network, as well as allowing subscribers of a circuit switched network to reach IMS subscriber. It also allows IMS subscribers to continue to use traditional telephone numbers, rather than SIP URIs, to reach other IMS subscribers. The use of TEL URIs to establish calls to IMS subscribers requires the IMS to perform a look-up operation to map TEL URIs to SIP URIs.

The handling of SIP messages containing a TEL URI as a destination field is not yet well defined for the IMS, although it might be assumed that where telephone numbers are specified in only a local format (i.e. in a format that is not globally unique), routing will require the inclusion within the TEL URI of a "phone-context" as defined in the IETF RFC 3966. A phone-context is a parameter which identifies the domain (e.g. network) within which the local format number exists.

SUMMARY OF THE PRESENT INVENTION

In the conventional circuit switched world, in the event that a caller dials a telephone number that does not have a national and international dialling prefix, the number is assumed to be a number within the local network. Similarly, if the dialled number has a national prefix but not an international prefix, the number is assumed to be a number within the country of the caller. In the case of a cellular telephone user, additionally, when the user is roaming abroad, these same rules are applied within the visited network, i.e. a dialled number that does not have a national and international dialling prefix is assumed to be a number within the visited network, etc. This way of handling roaming users is a result of the need to handle call routing solely within the visited network.

In the case of the IMS, SIP message routing is handled primarily within a user's home network, with the role of the visited network being to route the messages from a user to the home network. This approach ensures that authorisation and policy control can be properly enforced by the home network for its subscribers. This approach presents an opportunity to introduce greater flexibility into message routing in comparison, for example, to that which is possible in the conventional circuit switched world.

It is an object of the present invention to enable IMS/SIP users to decide in roaming situations where a local number is to be valid, either within the visited network or the user's home network. This is achieved by adding appropriate phone-context to a TEL URI in dependence upon a user's selection.

According to a first aspect of the present invention there is provided a method of routing a SIP message within an IP Multimedia Subsystem, the message originating at an IMS/SIP client attached to a visited network and containing as its destination address a TEL URI including a telephone number, the method comprising:

at the IMS/SIP client, specifying that the telephone number is a local number of the visited network or of a home network of the client;

including at the IMS/SIP client a phone-context within the TEL URI identifying the home network or the visited network according to the specification; and delivering the message from the client to the home network and receiving the message within the home network, and routing the message according to the phone-context contained within the TEL URI.

An example of a SIP message that may be routed by the method of the invention is a SIP INVITE message.

Typically, said phone-context is one of a set of global number digits and a domain name.

In one embodiment of the invention, the step of specifying that the telephone number is a local number of the visited network or of a home network of the client, comprises accepting a user selection via a user interface.

Preferably, the phone-context identifying the home network is preconfigured into a device in which the IMS/SIP client resides. More preferably, where the IMS/SIP client resides in a mobile wireless terminal, the phone-context identifying the home network is preconfigured into an ISIM or USIM of the terminal. The phone-context identifying the visited network may be obtained by the IMS/SIP client from the visited network, e.g. at the radio protocol layers of the terminal.

Where the visited network is a cellular network, the phone-context may contain identifications of the Mobile Network Code and Mobile Country Code of the visited network.

According to a second aspect of the present invention there is provided a user terminal comprising an IMS/SIP client, the IMS/SIP client being arranged in use to include in an outgoing SIP message a TEL URI used by the IMS network to route the message, and comprising means for selecting one of a visited network and home network phone-context for inclusion in the TEL URI to identify the network within which a telephone number also contained in the TEL URI is valid.

Preferably, the terminal comprises means for allowing a user to select one of the phone-contexts for inclusion in a TEL URI.

According to a third aspect of the present invention there is provided a Serving Call/Session Control Function for use in an IP Multimedia Subsystem and comprising means for receiving a SIP message containing a TEL URI, means for determining whether or not the S-CSCF has responsibility for the domain name or telephone number contained in the TEL URI, and, if it does not have responsibility, for using the domain name or number to perform a DNS query to obtain the address of an Interrogating Call/Session Control Function in the visited network which does have responsibility for the domain name or number.

According to a fourth aspect of the present invention there is provided an Interrogating Call/Session Control Function for use in an IP Multimedia Subsystem and comprising means for receiving a SIP message from a Serving Call/Session Control Function, the message containing a TEL URI in turn containing a telephone number in a local format, the Interrogating Call/Session Control Function comprising means for converting the number into a global format prior to querying the location of the number with a Home Subscriber Server.

According to a fifth aspect of the present invention there is provided a system for routing a SIP message within an IP Multimedia Subsystem, the message originating at an IMS/SIP client attached to a visited network and containing as its destination address a TEL URI including a telephone number, the system comprising:

at the IMS/SIP client, processing means for specifying that the telephone number is a local number of the visited network or of a home network of the client, and for including a phone-context within the TEL URI identifying the home network or the visited network according to the specification; and sending means for delivering the message from the client to the home network, and receiving means for receiving the message within the home network, and routing means for routing the message according to the phone-context contained within the TEL URI.

DETAILED DESCRIPTION OF CERTAIN EMBODIMENTS

Figure 1:
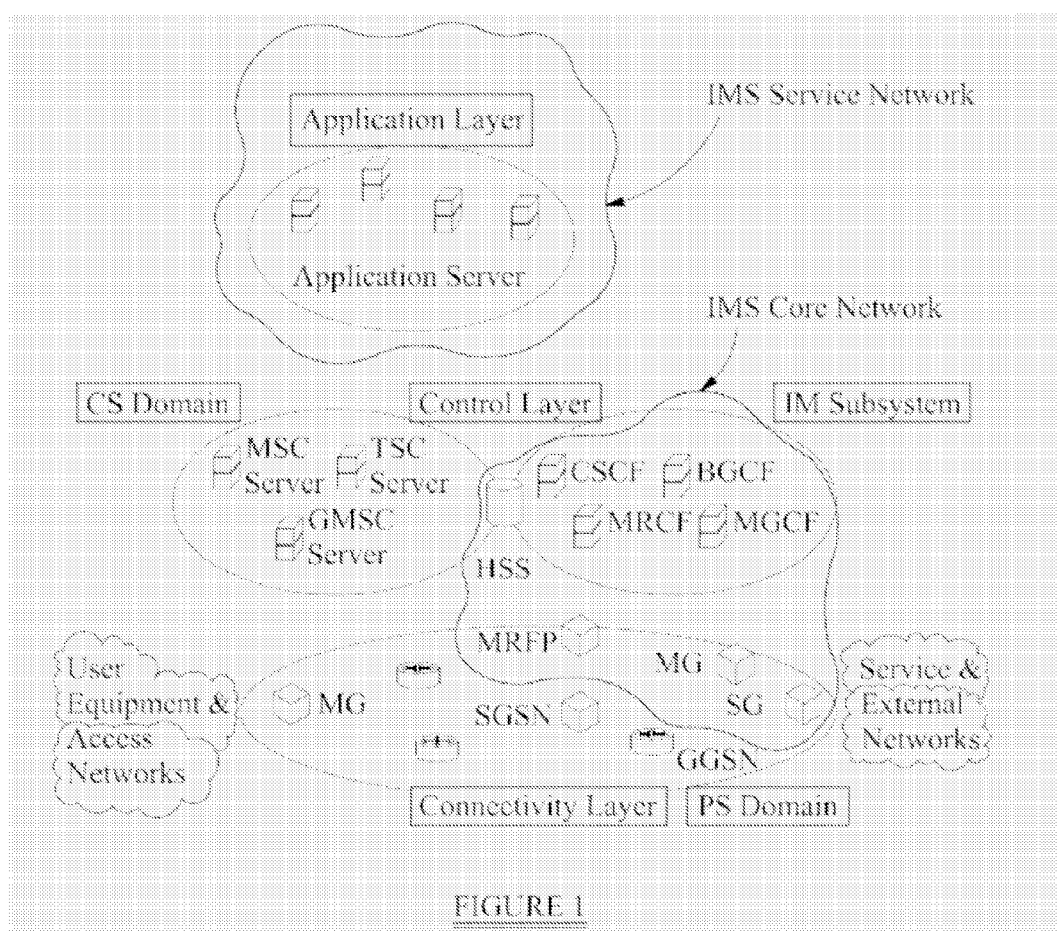
FIG. 1 illustrates schematically the IP Multimedia Subsystem implemented over a 3GPP network.

User terminals that are required to make use of the services provisioned by an IP Multimedia Subsystem incorporate an IMS/SIP client (software functionality). This client exchanges SIP signalling with other SIP entities of the IMS, as well as with peer IMS/SIP clients.

RFC3966 is concerned with specifying the structure of a TEL URI for use in routing messages across an IP based network such as the IMS. It is envisaged that TEL URIs will be used to route SIP messages, supplementing the specific SIP URIs as described above. More particularly, RFC3966 specifies that a TEL URI will contain a phone number part. In the event that this phone number is not a globally unique number however, the TEL URI must include a phone-context. A phone-context can be provided by a global number digit set, for example the initial digits of an E.164 number or Mobile Station International ISDN (e.g. +441234), or by a domain name, e.g. operator.com. For the purpose of this discussion, it is assumed that the phone-context is provided by a domain name.

The IMS/SIP client is modified according to the present proposal to allow a user of a terminal roaming in a visited network to specify whether a dialled number which is not a global telephone number, i.e. which does not have an international dialling prefix, is a local number within the visited network or within the user's home network. The IMS/SIP client includes the appropriate phone-context within the TEL URI according to the user's selection. A user may make a selection on a per-call basis, or may configure a setting of the IMS/SIP client so that the appropriate phone-context is added automatically.

Consider a user roaming in a visited network, and that the user wishes to dial a directory enquiry service. Assuming that the local number for this service is the same within the visited network and the home network, e.g. "118", the user has a choice as to which service he or she may use. In the event that the user wishes to use the service of the visited network, the SIP/IMS client will prepare a TEL URI having the following example structure:

tel:118;phone-context=term.ims.mnc015.mcc234.3gppnetwork.org where "ims.mnc", ".mcc" and ".3gppnetwork.org" are pre-defined strings according to section 13.2 Home Network Domain Name in 3GPP TS 23.003, and "term." allows the TEL URI to be used by the home network to find a terminating I-CSCF. "015" is an example of a Mobile Network Code (MNC), whilst "234" is an example of a Mobile Country Code (MCC). The IMS/SIP client obtains the MNC and the MCC from certain lower protocol layers, e.g. from the radio layers using an appropriate API.

In the event that the user chooses to use the 118 directory service of his or her home network, the TEL URI structure will look like:

tel:118;phone-context=ims.mnc008.mcc240.3gppnetwork.org where "008" is an example of a Mobile Network Code (MNC), and "240" is an example of a Mobile Country Code (MCC). In this case however, the UE uses the MCC and MNC of the IMSI stored in the USIM or SIM of the terminal, these identifying the user's home network. Where an ISIM is available in the terminal, the IMS/SIP client will include a home domain, stored in the ISIM, in the TEL URI:

tel:118;phone-context=vodafone.se.

Of course, it may be that the same dialled local number means different things to the visited and the home network. For example, 118 may be a directory service in one network, and an emergency call number in another. In this case, it is even more critical to enable a user to select the network in which the dialled number resides.

Considering now the routing procedures within the IMS, it will be understood that, according to normal 3GPP procedures, all non-REGISTER SIP requests are routed to the S-CSCF. A user terminal (UE) will already have obtained the address (or name) of the P-CSCF within the visited network using the P-CSCF discovery procedure during the PDP context activation or immediately after the PDP context activation using DHCP. The UE will also have obtained the name (or address) of the S-CSCF in its home network as a result of Service-Route in the REGISTER response. It is the S-CSCF in the user's home network which first analyses the Request-URI that contains the TEL URI with the entered local number.

In the case where the phone-context includes the home domain name of the user, the S-CSCF in the home network can add the proper global prefix and do an ENUM query to obtain the destination network of the request (expected behavior in IMS). Alternatively, the S-CSCF can define an originating trigger for the local number based on the assumption that the local number is a Public Service Identity (PSI). The next hop (and probably the final) destination will then be an Application Server associated with the originating trigger.

Figure 2:
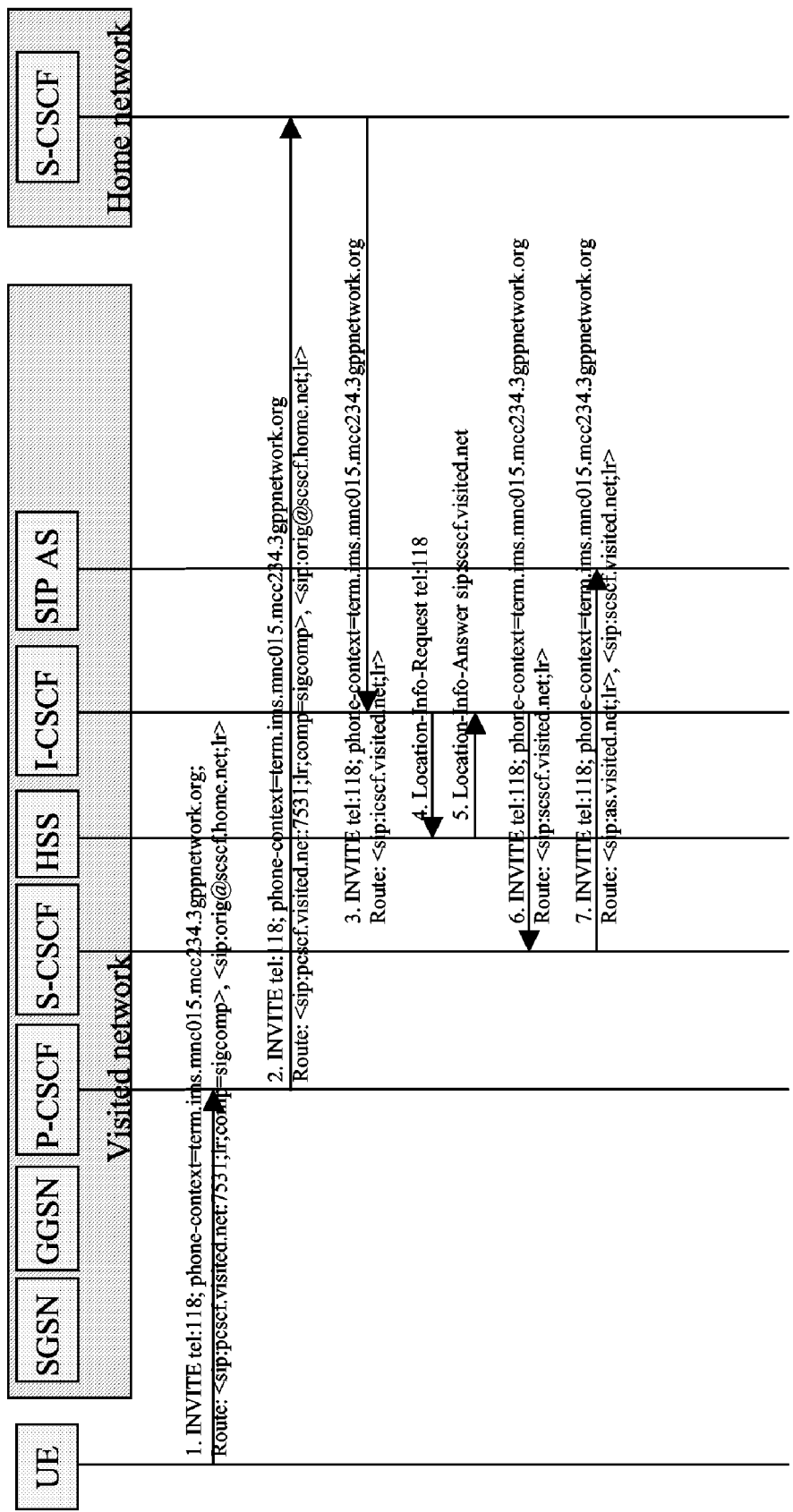
FIG. 2 is a signalling diagram illustrating SIP level signalling associated with a SIP session establishment procedure where a user applies a visited phone-context to the procedure.

An example signalling flow is illustrated in FIG. 2, for the case where the user has selected as the phone context the visited network. The steps of the flow are as follows:

1. The UE sends a session request (INVITE) to the P-CSCF found in the P-CSCF discovery procedure according to 3GPP. The request also includes the name (or address) of the home network S-CSCF based on the Service-Route content obtained from the earlier REGISTER response. This is in-line with normal 3GPP procedures.

2. The P-CSCF uses the Route header to find the S-CSCF of the home network according to normal 3GPP procedures, and the message is routed to that S-CSCF.

3. As the phone-context includes the domain name of the visited network, the S-CSCF will determine that it is not responsible for the domain in the phone-context. The S-CSCF will then use the domain name to query a DNS with an SRV query to find the I-CSCF in the visited network. [In the same way that is done by the visited P-CSCF to find the originating I-CSCF at registration.] The retrieved I-CSCF name is then included by the S-CSCF in the Route header of the request. The I-CSCF in the visited network acts as a terminating I-CSCF. The behavior in this step is not defined in 3GPP.

4. The I-CSCF then queries the location of the telephone number contained in the TEL URI from the Home Subscriber Server (HSS). The value in the Request-URI should then be defined as a "PSI user" in the HSS. If the TEL URI is a local number for a public user identity, either the HSS must support public user identities with this form of local TEL URI, or the I-CSCF must convert the local number to a global number before querying the HSS. [This public user identity behaviour for the TEL URI with global format is defined for terminating requests that originate from a Media Gateway Control Function (MGCF)]

5. The HSS returns to the I-CSCF the name of the S-CSCF within the visited network which is allocated to the called number.

6. The I-CSCF can then route the request to the appropriate S-CSCF within the visited network.

7. The S-CSCF within the visited network uses the identity in the Request-URI as a key to find the user identity (PSI or public user identity). The S-CSCF sends the request to the application server identified in the trigger match. The application server then performs the terminating service indicated by the local number in the Request-URI.

Figure 3:
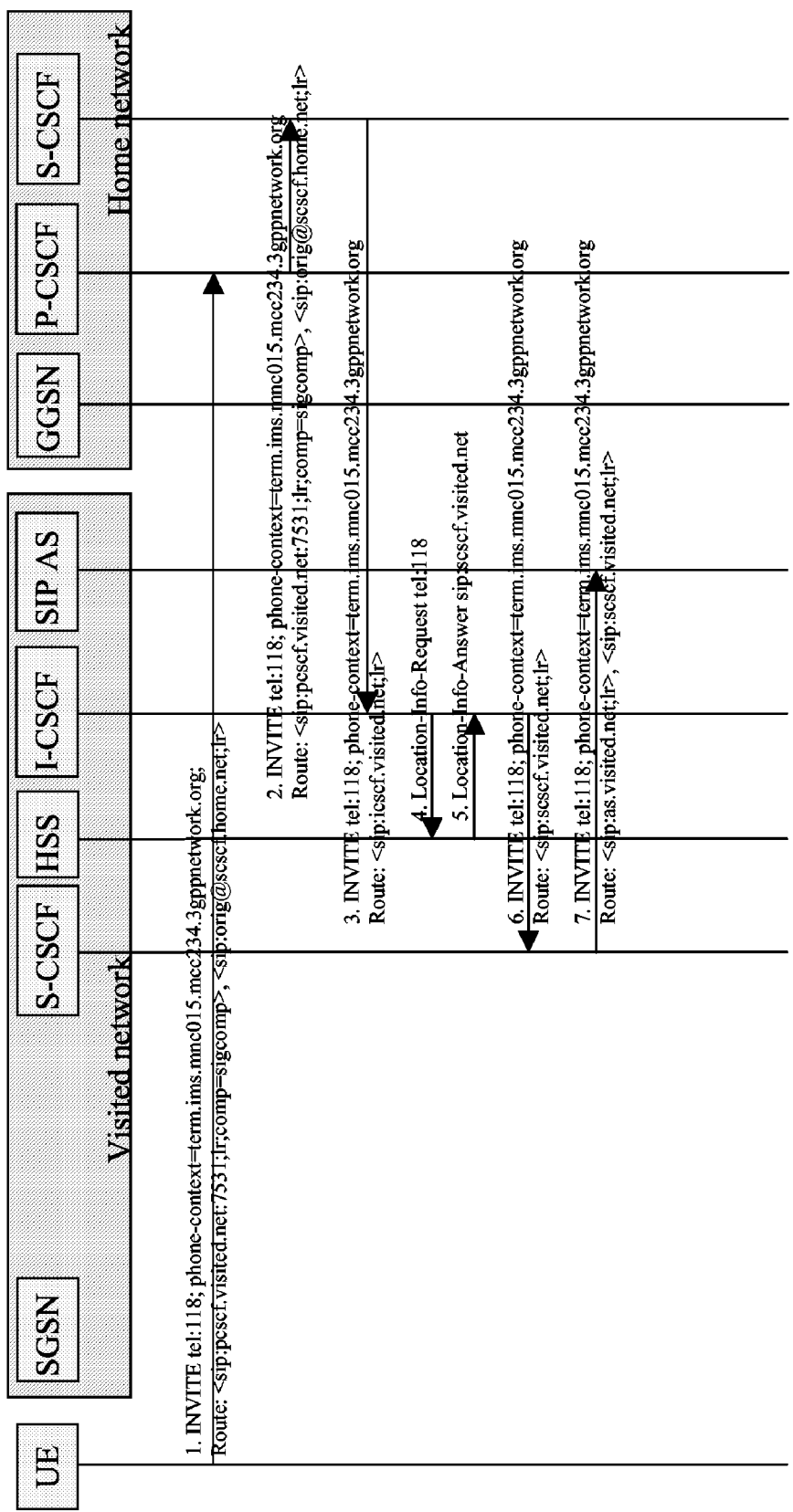
FIG. 3 is a signalling diagram illustrating SIP level signalling associated with a SIP session establishment procedure where a user applies a home phone-context to the procedure.

The solution presented here also works when General Packet Radio Service (GPRS) roaming is used instead of IMS roaming (assuming the visited network also has an IMS network), where routing of messages is via a Gateway GPRS Support Node (GGSN) which is (typically) located in the home network. Routing via a GGSN in the home network prohibits IMS routing. A signalling flow for GPRS roaming, where again it is assumed that the TEL URI contains a phone-context identifying the visited network, is illustrated in FIG. 3. It will be noted that in this case the initial request (INVITE) is routed directly to the P-CSCF of the home network.

It will be appreciated by the person of skill in the art that various modifications may be made to the above described embodiments without departing from the scope of the present invention. For example, whilst the above embodiments have been concerned with users of mobile wireless terminal, the invention may be applied to fixed terminal or wired mobile terminals (such as laptop computers) which are attached to one network, whilst also having a subscription to, or access to, a home network.

The invention claimed is:

1. A method of routing a Session Initiation Protocol (SIP) message within an IP Multimedia Subsystem (IMS), the message originating at an IMS/SIP client attached to a visited network and containing as its destination address, a Telephone Uniform Resource Indicator (TEL URI) including a local telephone number, the method comprising:

at the IMS/SIP client, specifying whether the telephone number is a local number of the visited network or a local number of a home network of the client;

determining one of a global number digit set or a domain name of the network specified in the specifying step, wherein the IMS/SIP client resides in a mobile wireless terminal, and the global number digit set or domain name identifying the home network is preconfigured into an IP Multimedia Services Identity Module (ISIM) or Universal Subscriber Identity Module (USIM) of the terminal, and wherein the IMS/SIP client obtains at radio protocol layers of the terminal, the global number digit set or domain name identifying the visited network;

including at the IMS/SIP client, a phone-context within the TEL URI, said phone-context containing the determined global number digit set or domain name;

delivering the message from the IMS/SIP client to the home network; and routing the message by the home network according to the phone-context contained within the TEL URI.

2. The method according to claim 1, wherein said message is a SIP INVITE message.

3. The method according to claim 1, wherein the specifying step includes accepting a user selection of the visited network or home network via a user interface.

4. The method according to claim 1, wherein the phone-context is a global number digit set containing identifications of the Mobile Network Code and Mobile Country Code of the visited network.

5. A user terminal, comprising a processor coupled to a non-transitory memory, wherein the processor is configured to act as an Internet Protocol Multimedia Subsystem (IMS)/ Session Initiation Protocol (SIP) client by causing the user terminal to:

place in an outgoing SIP message, a Telephone Uniform Resource Indicator (TEL URI) used by an IMS network to route the message, said TEL URI including a local telephone number;

specify in the outgoing SIP message, whether the local telephone number is a local number of the visited network or a local number of a home network of the client;

determine a global number digit set or a domain name of the network specified in the outgoing SIP message, wherein the IMS/SIP client resides in a mobile wireless terminal, and the global number digit set or domain name identifying the home network is preconfigured into an IP Multimedia Services Identity Module (ISIM) or Universal Subscriber Identity Module (USIM) of the terminal, and wherein the IMS/SIP client is configured to obtain at radio protocol layers of the terminal, the global number digit set or domain name identifying the visited network; and include the selected global number set or domain name as a phone-context for inclusion in the TEL URI to identify the network within which the telephone number in the TEL URI is valid.

6. The terminal according to claim 5, wherein the processor is also configured to control the terminal to enable a user to select either the visited network or the home network global number digit set or domain name for inclusion in the TEL URI.

7. A Serving Call/Session Control Function (S-CSCF) for use in an IP Multimedia Subsystem, said S-CSCF comprising a processor coupled to a non-transitory memory, wherein the processor is configured to cause the S-CSCF to:

receive from an Internet Protocol Multimedia Subsystem/ Session Initiation Protocol (IMS/SIP) client, a SIP message containing a Telephone Uniform Resource Indicator (TEL URI), said TEL URI containing a telephone number and a phone-context comprising either a global number digit set or a domain name determined by the IMS/SIP client, the global number set or the domain name identifying a home or a visited network, wherein the IMS/SIP client resides in a mobile wireless terminal, and the global number digit set or domain name identifying the home network is preconfigured into an IP Multimedia Services Identity Module (ISIM) or Universal Subscriber Identity Module (USIM) of the terminal, and wherein the global number digit set or domain name identifying the visited network is obtained by the IMS/ SIP client at radio protocol layers of the terminal;

determine whether the S-CSCF has responsibility for the domain name or telephone number contained in the TEL URI;

route a call to the telephone number when the S-CSCF has responsibility for the domain name or telephone number contained in the TEL URI; and utilize the domain name or global number digit set to perform a Domain Name System (DNS) query to obtain the address of an Interrogating Call/Session Control Function (I-CSCF) in a visited network which does have responsibility for the domain name or number when the S-CSCF does not have responsibility for the domain name or telephone number contained in the TEL URI.

8. A system for routing a Session Initiation Protocol (SIP) message within an IP Multimedia Subsystem (IMS), the SIP message originating at an IMS/SIP client attached to a visited network and containing as its destination address, a Telephone Uniform Resource Indicator (TEL URI) including a telephone number, the system comprising:

a processor at the IMS/SIP client configured to:

specify in the SIP message that the telephone number is a local number of the visited network or of a home network of the client;

determine one of a global number digit set or a domain name of the network specified in the SIP message, wherein the IMS/SIP client resides in a mobile wireless terminal, and the global number digit set or domain name identifying the home network is preconfigured into an IP Multimedia Services Identity Module (ISIM) or Universal Subscriber Identity Module (USIM) of the terminal, and wherein the IMS/SIP client is configured to obtain at radio protocol layers of the terminal, the global number digit set or domain name identifying the visited network; and include a phone-context containing the determined global number digit set or domain name within the TEL URI in the SIP message; and a transport network configured to deliver the SIP message from the IMS/SIP client to the home network;

wherein the home network is configured to route the message according to the phone-context contained within the TEL URI.

* * * * *